(12) United States Patent
Okada et al.

(10) Patent No.: US 7,967,102 B2
(45) Date of Patent: Jun. 28, 2011

(54) STEERING SHAFT SUPPORT STRUCTURE AND VEHICLE

(75) Inventors: Megumu Okada, Saitama (JP); Keita Yagi, Saitama (JP); Yotaro Mori, Saitama (JP); Takeshi Wakabayashi, Saitama (JP); Kihoko Kaita, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 130 days.

(21) Appl. No.: 11/588,252

(22) Filed: Oct. 27, 2006

(65) Prior Publication Data
US 2007/0096449 A1    May 3, 2007

(30) Foreign Application Priority Data
Oct. 31, 2005  (JP) ................................ 2005-315631

(51) Int. Cl.
   *B62D 5/02* (2006.01)
(52) U.S. Cl. ...................................... 180/443; 180/444
(58) Field of Classification Search .................. 180/443, 180/444
   See application file for complete search history.

(56) References Cited

U.S. PATENT DOCUMENTS

| | | | | |
|---|---|---|---|---|
| 6,041,884 A * | 3/2000 | Shimizu et al. | ............... | 180/443 |
| 6,817,437 B2 * | 11/2004 | Magnus et al. | ............... | 180/403 |
| 6,966,399 B2 * | 11/2005 | Tanigaki et al. | ............... | 180/444 |
| 7,182,169 B2 * | 2/2007 | Suzuki | ........................... | 180/426 |
| 7,216,733 B2 * | 5/2007 | Iwami et al. | ................... | 180/68.1 |
| 2002/0005314 A1 * | 1/2002 | Takehara et al. | .............. | 180/443 |
| 2003/0188918 A1 * | 10/2003 | Shimizu et al. | ............... | 180/444 |
| 2005/0087384 A1 * | 4/2005 | Magnus et al. | ............... | 180/402 |
| 2005/0282641 A1 * | 12/2005 | Sadakata et al. | .............. | 464/134 |
| 2006/0006021 A1 * | 1/2006 | Takimoto et al. | ............. | 180/446 |
| 2006/0162989 A1 * | 7/2006 | Yamada | ........................ | 180/444 |
| 2006/0258468 A1 | 11/2006 | Sekine et al. | | |

FOREIGN PATENT DOCUMENTS

JP  2004-231011 A  8/2004
WO  WO 2004/113752 A1  12/2004

* cited by examiner

*Primary Examiner* — Joanne Silbermann
*Assistant Examiner* — Tashiana Adams
(74) *Attorney, Agent, or Firm* — Birch, Stewart, Kolasch & Birch, LLP

(57) ABSTRACT

A steering shaft support structure for an all terrain vehicle in which both forces of push and pull applied to an EPS unit are reduced when a load is applied to handlebars. The structure includes a steering shaft rotatably supported by a body frame and handlebars attached to the steering shaft. The EPS unit is also supported by the body frame. Two sets of adjustable joints are interposed between the steering shaft and the EPS unit in such a manner that their axes are shiftable. With this, if a load is applied to the handlebars, the adjustable joint associated with the steering shaft follows the inclination of the steering shaft, so that the connection point (swing point) of the adjustable joint associated with the EPS unit does not shift. This reduces both forces of push and pull applied to the EPS unit.

20 Claims, 4 Drawing Sheets

STEERING SHAFT SUPPORT STRUCTURE AND VEHICLE

CROSS-REFERENCE TO RELATED APPLICATION

The present application claims priority under 35 U.S.C. §119 to Japanese Patent Application No. 2005-315631, filed Oct. 31, 2006, the entire contents of which are hereby incorporated by reference.

BACKGROUND OF THE INVENTION

1. Field of the Invention

The present invention relates to a steering shaft support structure suitably applicable to vehicles such as all terrain vehicles (ATV).

2. Description of Background Art

The conventional vehicles of this type are configured such that a steering shaft is rotatably supported by an upper portion of a body frame via a bearing and a bushing and an EPS (Electric Power Steering) unit is supported by a lower portion of the body frame. The lower end of the steering shaft is connected to the input shaft of the EPS unit via an adjustable joint (see e.g. Japanese Patent Laid-open No. 2004-231011 (paragraph [0031], FIG. 4).

However, since this configuration has only one adjustable joint, if a load is applied to the handlebars due to some causes, the steering shaft is inclined with respect to a point of connection with the body frame. Consequently, the connection point (swing point) of the adjustable joint shifts. This causes both forces of push and pull to be applied to the input shaft of the EPS unit. Since the EPS unit includes delicate parts such as a sensor unit, for example, it is desirable to reduce both the forces of push and pull applied to the EPS unit as much as possible.

SUMMARY AND OBJECTS OF THE INVENTION

It is an object of the present invention to provide a steering shaft support structure and a vehicle capable of meeting such a desire.

According to a first aspect of the present invention, in a vehicle in which a steering shaft is rotatably supported by a body frame, handlebars are attached to the steering shaft and an EPS unit is supported by the body frame, a steering shaft support structure includes a plurality of sets of adjustable joints interposed between the steering shaft and an input shaft of the EPS unit.

According to a second aspect of the present invention, the plurality of sets of adjustable joints have axes offset from each other.

According to a third aspect of the present invention, the body frame has a head pipe and the steering shaft is rotatably supported at a plurality of points by the head pipe.

According to a fourth aspect of the present invention, the adjustable joints are disposed in a space enclosed by the body frame.

According to a fifth aspect of the present invention, a vehicle is provided with the steering shaft support structure as described above.

EFFECT OF THE INVENTION

According to the present invention, since the plurality of sets of adjustable joints are interposed between the steering shaft and the EPS unit, if a load is applied to the handlebars, the adjustable joint associated with the steering shaft follows the inclination of the steering shaft, thereby absorbing the inclination. Therefore, even if a load is applied to the handlebars, the connection point (swing point) of the adjustable joint associated with the EPS unit does not shift. This can reduce both forces of push and pull applied to the EPS unit.

In addition, since the axes of the plurality of sets of adjustable joints are offset from each other, increased displacement can be ensured when the adjustable joint are pulled by the inclination of the steering shaft.

Further, since the steering shaft is rotatably supported at a plurality of points by the head pipe, the inclination of the steering shaft can be suppressed and also the shaft center of the steering shaft can be positioned high-precisely Still further, since the adjustable joints are disposed in a space enclosed by the body frame, they are unlikely to come into contact with other components, thereby exhibiting their own functions sufficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
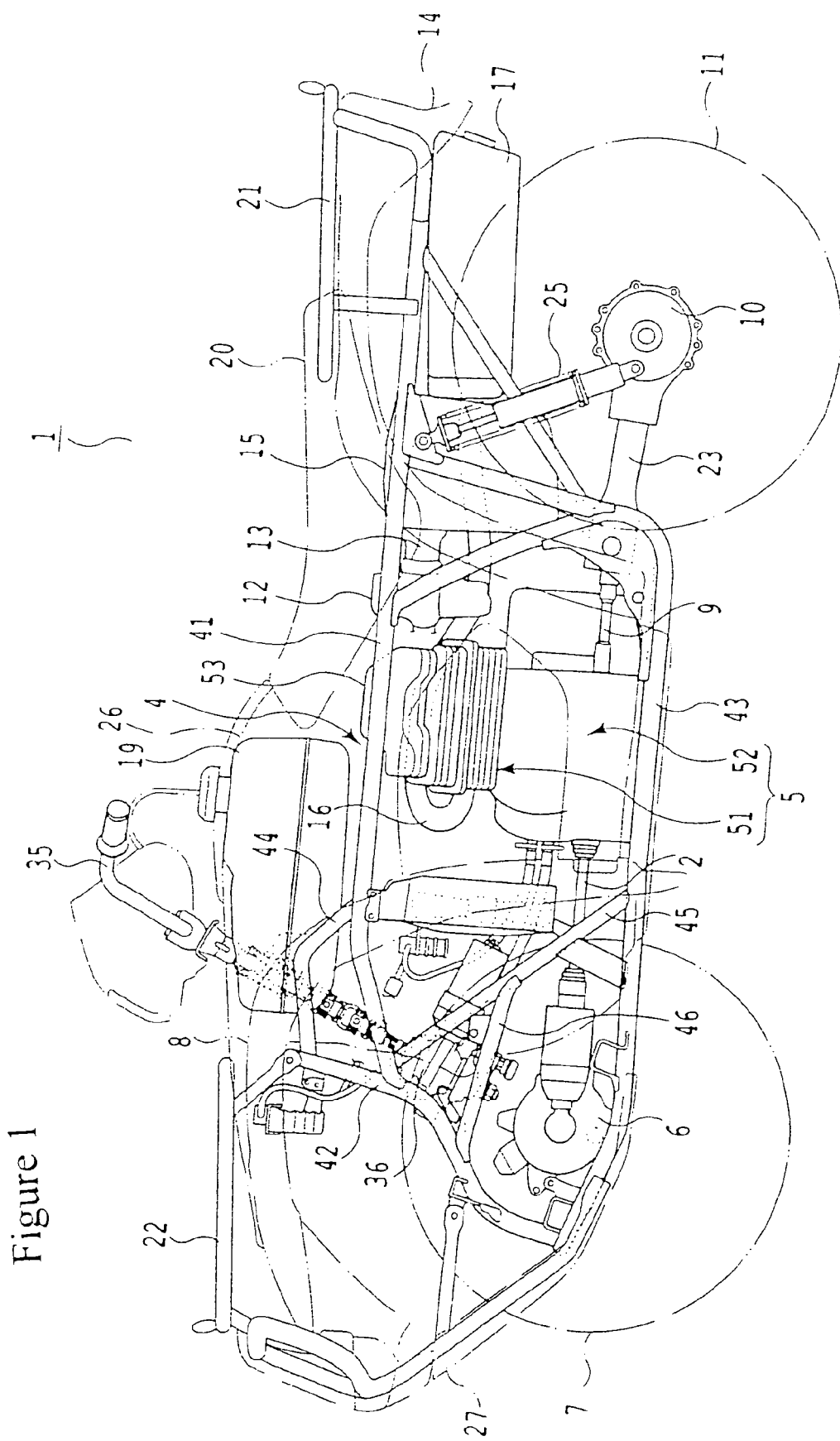
FIG. 1 is a left side view of an all terrain vehicle provided with a steering shaft support structure according to a first embodiment of the present invention.

With reference to FIG. 1, an all terrain vehicle (vehicle) 1 includes a body frame 4. The body frame 4 includes a pair of left and right upper main frames 41 extending in a back-and-forth direction, a front frame 42, a pair of left and right lower main frames 43, a pair of left and right front upper frames 44, a pair of left and right tilt frames 45, and a pair of left and right sub tilt frames 46. The front frame 42 has an inverse-U shape as viewed from the front and is joined to the front ends of the upper main frames 41. The lower main frames 43 are each spanned between and joined to the lower end of the front frame 42 and an intermediate portion of the upper main frame 41. The front upper frames 44 are each doglegged and spanned between and joined to the upper end of the front frame 42 and a portion, slightly rearward of the front end, of the upper main frame 41. The tilt frames 45 each extend from the front end of the upper main frame 41 obliquely downwardly and joined to an intermediate portion of the lower main frame 43. The sub tilt frames 46 are each spanned between and joined to an intermediate portion of the tilt frame 45 and an intermediate portion of the front frame 42.

As shown in FIG. 1, a power unit 5 is mounted on the lower main frames 43 so as to be located at the central portion of the body frame 4. The power unit 5 includes an engine 51 and a transmission 52.

The engine 51 includes a cylinder head 53 as shown in FIG. 1. A carburetor 12 is located rearward of the cylinder head 53 and connected thereto. An air cleaner 15 is connected to the carburetor 12 via a connecting tube 13. On the other hand, an exhaust pipe 16 is joined to the front portion of the cylinder head 53 in such a manner as to extend rearward of the body frame 4. A muffler (silencer) 17 is attached to the leading end (rear end) of the exhaust pipe 16.

As shown in FIG. 1, a front final reduction gear 6 is located forward of and connected to the transmission 52 via a front propeller shaft 2 and left-hand and right-hand front wheels 7 are connected to the front final reduction gear 6 via drive shafts (not shown). A front fender 8 is attached to the vicinity of the front wheels 7 to cover the front wheels 7 from the upside and rearward. On the other hand, a rear final reduction gear 10 is located rearward of and connected to the transmission 52 via a rear propeller shaft 9 and left-hand and right-hand rear wheels 11 are connected to a rear final reduction gear 10 via drive shafts (not shown). Further, a rear fender 14 is attached to the vicinity of the rear wheels 11 so as to cover the rear wheels 11 from the upside and forward.

Referring to FIG. 1, a fuel tank 19, a seat 20, and a rear carrier 21 are mounted on the front portions, central portions and rear portions, respectively, of the upper main frames 41. On the other hand, a front carrier 22 is mounted on the upper portions of the front frames 42.

As shown in FIG. 1, a swing arm 23 is swingably joined to the rear part of the lower main frame 43 in such a manner as to extend rearward of the body frame 4. In addition, a rear cushion unit 25 is spanned between the rear part of the swing arm 23 and the upper main frame 41.

A body side cover 26 is attached to the body frame 4 to cover the side of the power unit 5 and a skid plate 27 is attached to the body frame 4 to cover the front of the lower main frames 43, as illustrated in FIG. 1.

Figure 2:
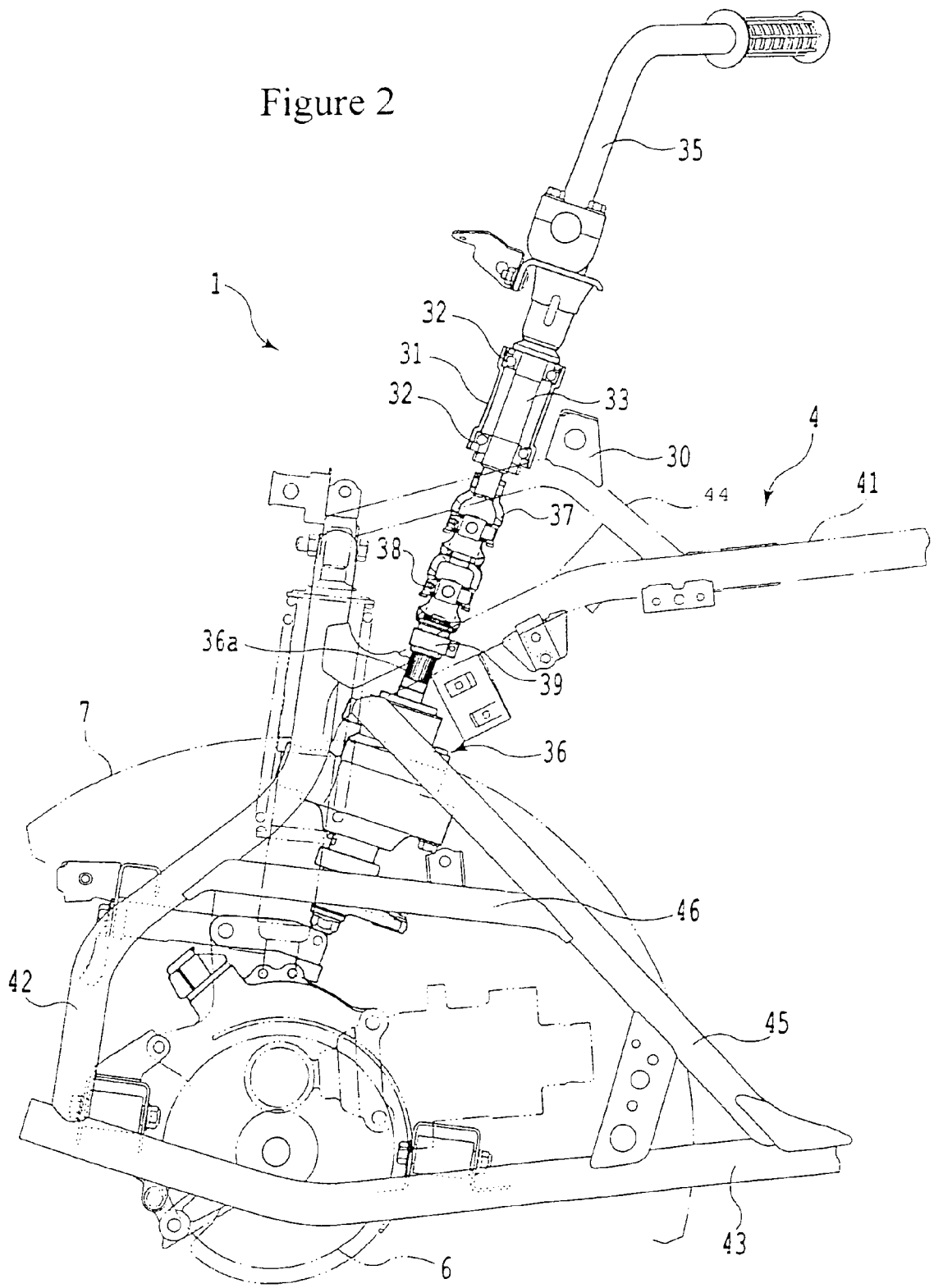
FIG. 2 is a side view illustrating an essential portion of the all terrain vehicle depicted in FIG. 1.

Meanwhile, a cylindrical head pipe 31 is secured to the front upper frames 44 via brackets 30 as shown in FIG. 2. A steering shaft 33 is rotatably supported by the head pipe 31 via two bearings 32 internally provided to be spaced apart from each other in an up-and-down direction. Handlebars (handle) 35 are attached to the upper end of the steering shaft 33. Below the steering shaft 33 an EPS unit 36 is supported by the tilt frames 45 and the sub tilt frames 46 so as to be secured thereto. The EPS unit 36 includes an input shaft 36a, a sensor unit, a gear unit, a motor unit in order to reduce a steering force for the front wheels 7. The shaft center CT2 of the input shaft 36a coincides with the shaft center CT1 of the steering shaft 33. Two sets of adjustable joints 37, 38 connected in series with each other are interposed between the lower end of the steering shaft 33 and the input shaft 36a of the EPS unit 36 in such a manner that their axes can be shiftable.

Figure 3:
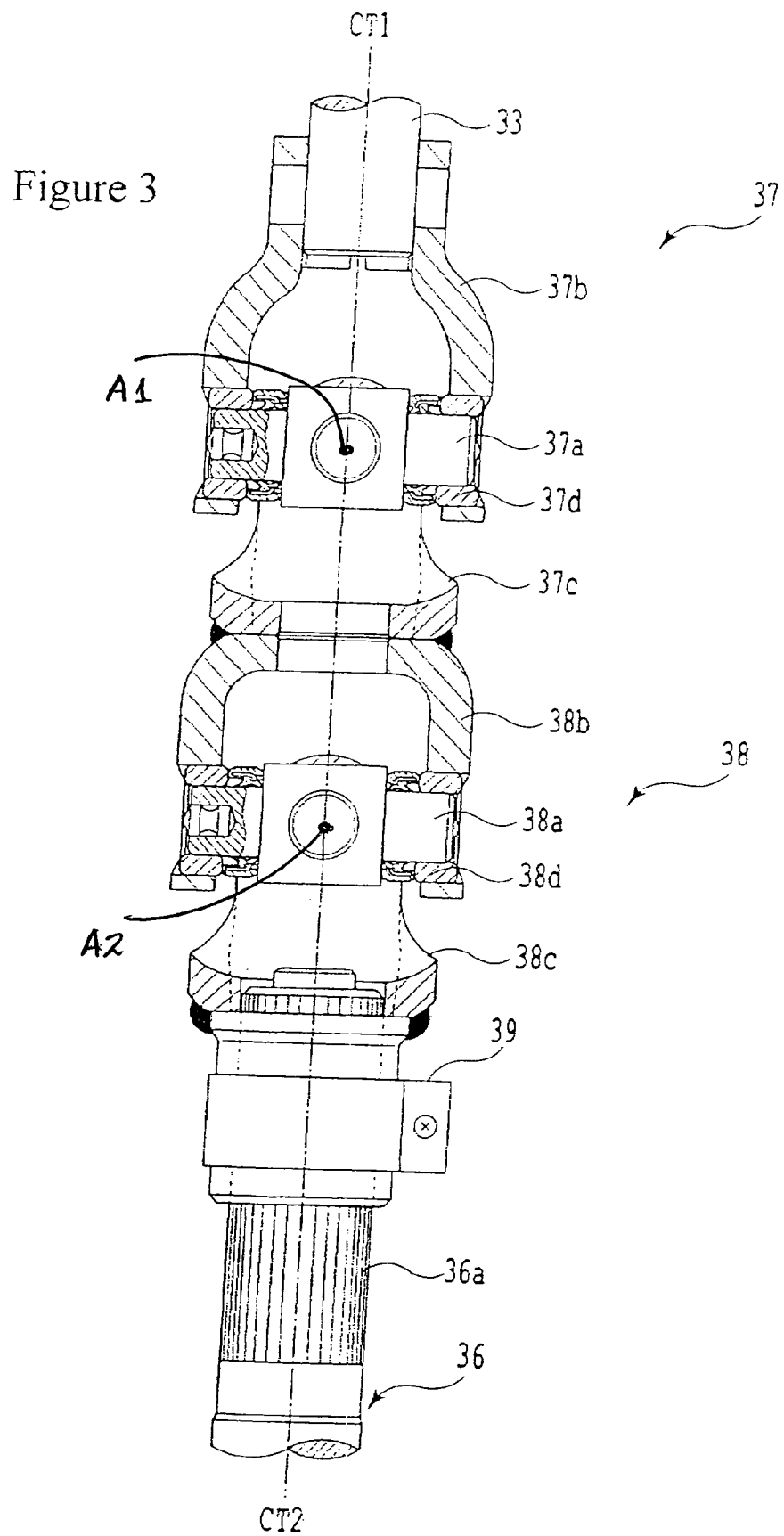
FIG. 3 is a detailed view of the adjustable joints depicted in FIG. 2.

As shown in FIG. 2, the adjustable joints 37, 38 are disposed in a space enclosed by the upper main frames 41, front frame 42 and front upper frames 44 of the body frame 4. The adjustable joint 37 associated with the steering shaft 33 has a joint cross 37a as shown in FIG. 3. Fork-like U-shaped yokes 37b, 37c are rotatably attached to the joint cross 37a from both sides, i.e. the upside and the downside, respectively, via a bearing 37d in such a manner as to be offset with each other by 90°. On the other hand, the adjustable joint 38 associated with the EPS unit 36 has a joint cross 38a and fork-like U-shaped yokes 38b, 38c are rotatably attached to the joint cross 38a from both sides, i.e. the upside and the downside, respectively, via a bearing 38d in such a manner as to be offset with each other by 90°. Regardless of how the steering shaft 33 is rotated, one axis (A1) of joint cross 37a remains parallel to one axis (A2) of joint cross 38a. The upper side yoke 37b of the adjustable joint 37 associated with the steering shaft 33 is bolted to the lower end of the steering shaft 33. The lower side yoke 37c of the adjustable joint 37 associated with the steering shaft 33 is welded to the upper side yoke 38b of the adjustable joint 38 associated with the EPS unit 36. The lower side yoke 38c of the adjustable joint 38 associated with the EPS unit 36 is spline joined to the input shaft 36a of the EPS unit 36. To ensure the spline joint, the lower end of the yoke 38c is configured such that a metal belt 39 is wound around and fastened up to a cylindrical part formed with about four longitudinal slits (not shown).

With the all terrain vehicle 1 configured described above, when an operator operates the handlebars 35 to steer the front wheels 7, the power of the handlebars 35 is transmitted to the input shaft 36a of the EPS unit 36 through the steering shaft 33 and the adjustable joints 37, 38. Upon receiving the power, the EPS unit 36 detects the power inputted to the input shaft 36a by the sensor unit, and based on the detected result the motor unit assists the rotary power of the steering shaft 33. As a result, the steering force of the front wheels 7 is reduced, so that the handlebars 35 can be operated agilely.

In this case, the steering shaft 33 is supported by the head pipe 31 via the two bearings 32, namely, via two-point support. Therefore, the inclination of the steering shaft 33 resulting from the operation of the handlebars 35 can be suppressed. Even if the steering shaft 33 is inclined to slightly shift the shaft center CT1, since the adjustable joints 37, 38 are interposed between the steering shaft 33 and the EPS unit 36, the power of the handlebars 35 can be surely transmitted to the input shaft 36a of the EPS unit 36.

Since the shaft center CT1 of the steering shaft 33 is positioned by only a single member, namely, the head pipe 31, the steering shaft 33 can be positioned high-precisely as compared with when the shaft center CT1 is positioned by a plurality of members.

In addition, the two sets of adjustable joints 37, 38 are interposed between the steering shaft 33 and the EPS unit 36. Therefore, if a load is applied to the handlebars 35 due to some causes, the adjustable joint 37 associated with the steering shaft 33 follows the inclination of the steering shaft 33, thereby absorbing the inclination. In other words, even if a load is applied to the handlebars 35, the connection point (swing point) of the adjustable joint 38 associated with the EPS unit 36 will not shift. This can reduce both forces of push and pull applied to the EPS unit 36.

Further, since the adjustable joints 37, 38 are disposed in the space enclosed by the body frame 4, they are unlikely to come into contact with other components, exhibiting their own functions sufficiently.

Figure 4:
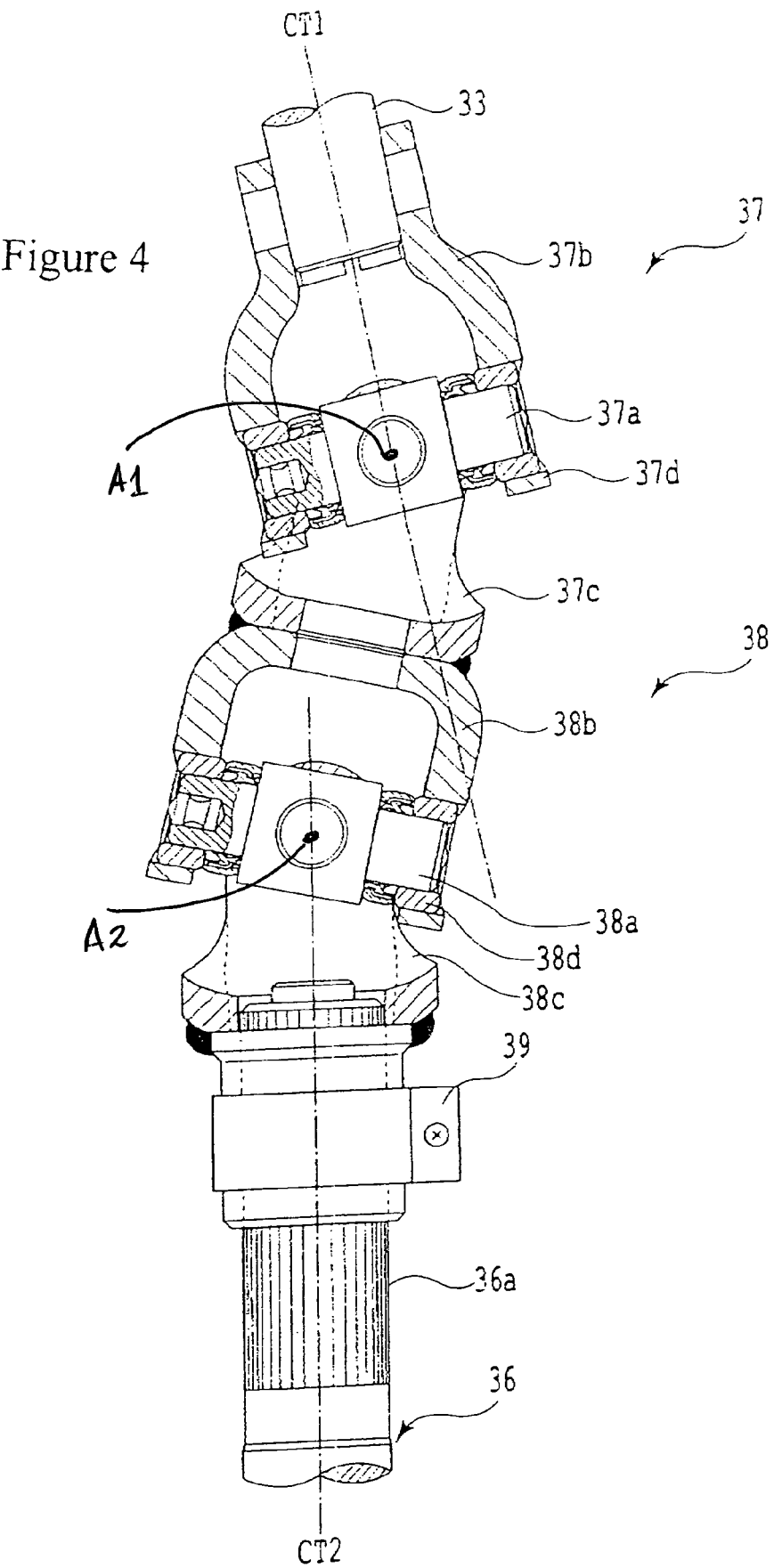
FIG. 4 is a side view of a steering shaft support structure according to a second embodiment of the present invention.

Incidentally, the above embodiment describes the case where the shaft center CT2 of the input shaft 36a of the EPS unit 36 coincides with the shaft center CT1 of the steering shaft 33. However, as shown in FIG. 4, if the shaft center CT2 of the input shaft 36a of the EPS unit 36 does not coincide with the shaft center CT1 of the steering shaft 33, the axes of the two sets of the adjustable joints 37, 38 are caused to be offset from each other. Regardless of how the steering shaft 33 is rotated and oriented, one axis (A1) of joint cross 37a remains parallel to one axis (A2) of joint cross 38a. This can provide the same function and effect as those of the first embodiment. In this case, increased displacement can be ensured when the adjustable joint 37 is pulled by the inclination of the steering shaft 33.

The above embodiment describes the case where the two sets of the adjustable joints 37, 38 are interposed between the steering shaft 33 and the EPS unit 36. However, three sets or more of adjustable joints may be interposed therebetween.

While the above embodiment describes the all terrain vehicle 1 equipped with the handlebars 35, the present invention can be applied to the all terrain vehicle 1 equipped with a steering wheel, not the handlebars 35.

The above embodiment describes the case where the steering shaft 33 is supported via the two bearings 32; however, the steering shaft 33 may be supported via three or more bearings.

While the above embodiment describes the all terrain vehicle 1 by way of example, the present invention may be applied to vehicles (e.g., combine harvesters, forklifts, etc.) other than the all terrain vehicle 1.

The present invention can be widely applied to all terrain vehicles and other vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a vehicle in which a steering shaft is rotatably supported by a body frame, handlebars are attached to the steering shaft, and an electric power steering unit (EPS) is supported by the body frame,
a steering shaft support structure comprising:
a plurality of sets of adjustable joints interposed between the steering shaft and an input shaft of the EPS unit,
wherein the plurality of sets of adjustable joints includes a first one of the adjustable joints having a lower side yoke that is permanently fixed and directly attached in a non-movable relationship relative to an upper side yoke of a second one of the adjustable joints.

2. The steering shaft support structure according to claim 1, wherein the plurality of sets of adjustable joints have axes offset from each other,
wherein the body frame has a head pipe and the steering shaft is rotatably supported at a plurality of points by the head pipe.

3. The steering shaft support structure according to claim 2, wherein the body frame has a head pipe and the steering shaft is rotatably supported at a plurality of points by the head pipe.

4. The steering shaft support structure according to claim 2 wherein the first one of the adjustable joints includes a first joint cross, and the second one of the adjustable joints includes a second joint cross, and
regardless of how the steering shaft is rotated and oriented, one axis (A1) of the first joint cross remains parallel to one axis (A2) of the second joint cross.

5. The steering shaft support structure according to claim 1, wherein the adjustable joints are disposed in a space enclosed by the body frame.

6. The steering shaft support structure according to claim 1, wherein the first one of the adjustable joints is associated with the steering shaft includes a first joint cross, and a pair of first U-shaped yokes rotatably attached to the first joint cross from both sides via a first bearing in such a manner as to be offset with each other by 90°, and
the second one of the adjustable joints is associated with the EPS unit and includes a second joint cross, and a pair of second U-shaped yokes rotatably attached to the second joint cross from both sides via a second bearing in such a manner as to be offset with each other by 90°, and
since the part of the first one of the adjustable joints is directly attached in a non-movable relationship relative to the part of the second one of the adjustable joints, a center point of the first joint cross and a center point of the second joint cross are separated by a constant distance.

7. The steering shaft support structure according to claim 1, wherein the plurality of sets of adjustable joints have axes offset from each other when a shaft center (CT2) of the input shaft does not coincide with the shaft center (CT1) of the steering shaft.

8. The steering shaft support structure according to claim 1, wherein the adjustable joints are disposed in a space enclosed by upper main frames, front upper frames, and a front frame.

9. A vehicle provided with the steering shaft support structure according to claim 1.

10. A steering shaft support structure for rotatably supporting a steering shaft on a body frame, the steering shaft support structure comprising:
at least two sets of adjustable joints interposed between the steering shaft and an input shaft of the electric power steering (EPS) unit,
wherein handlebars are attached to the steering shaft and an electric power steering unit is supported by the body frame,
wherein the at least two sets of adjustable joints includes a first one of the adjustable joints having a part with a surface that is parallel to and permanently fixed and directly attached in a non-movable relationship relative to a surface of a part of a second one of the adjustable joints, regardless of how the steering shaft is rotated and oriented with respect to the input shaft.

11. The steering shaft support structure according to claim 10, wherein the plurality of sets of adjustable joints have axes offset from each other.

12. The steering shaft support structure according to claim 11, wherein the body frame has a head pipe and the steering shaft is rotatably supported at a plurality of points by the head pipe.

13. The steering shaft support structure according to claim 10, wherein the body frame has a head pipe and the steering shaft is rotatably supported at a plurality of points by the head pipe.

14. The steering shaft support structure according to claim 10, wherein the adjustable joints are disposed in a space enclosed by the body frame.

15. The steering shaft support structure according to claim 10, wherein the first one of the adjustable joints is associated with the steering shaft includes a first joint cross, and a pair of first U-shaped yokes rotatably attached to the first joint cross from both sides via a first bearing in such a manner as to be offset with each other by 90°, and
the second one of the adjustable joints is associated with the EPS unit and includes a second joint cross, and a pair of second U-shaped yokes rotatably attached to the second joint cross from both sides via a second bearing in such a manner as to be offset with each other by 90°, and
since the part of the first one of the adjustable joints is directly attached in a non-movable relationship relative to the part of a second one of the adjustable joints, a center point of the first joint cross and the center point of the second joint cross are separated by a constant distance.

16. The steering shaft support structure according to claim 10, wherein the plurality of sets of adjustable joints have axes offset from each other when a shaft center (CT2) of the input shaft does not coincide with the shaft center (CT1) of the steering shaft.

17. The steering shaft support structure according to claim 10, wherein the adjustable joints are disposed in a space enclosed by upper main frames, front upper frames, and a front frame.

18. A vehicle provided with the steering shaft support structure according to claim 10.

19. A steering shaft support structure for rotatably supporting a steering shaft on a body frame, the steering shaft support structure comprising:
 a first adjustable joint having a U-shaped part with a lower surface that is parallel to and directly attached in a permanently fixed position to an upper surface of an inverted U-shaped part of a second adjustable joint,
 the U-shaped part and the inverted U-shaped part being permanently fixed to each other in an manner in which the U-shaped part and the inverted U-shaped part face outwardly in directions which are substantially 90° apart,
 wherein both of the adjustable joints are interposed between the steering shaft and an input shaft of the EPS unit.

20. The steering shaft support structure according to claim 19, wherein the first adjustable joint includes a first joint cross, and the second adjustable joint includes a second joint cross, and
 regardless of how the steering shaft is rotated and oriented with respect to the input shaft, one axis (A1) of the first joint cross remains parallel to one axis (A2) of the second joint cross.

* * * * *